United States Patent
Tan

(10) Patent No.: US 7,469,908 B2
(45) Date of Patent: Dec. 30, 2008

(54) POWER DRILL CHUCK

(75) Inventor: Xingda Tan, Shandong (CN)

(73) Assignee: Shangdong Weida Machinery Co., Ltd., Wendeng (CN)

( * ) Notice: Subject to any disclaimer, the term of this patent is extended or adjusted under 35 U.S.C. 154(b) by 470 days.

(21) Appl. No.: 10/528,481

(22) PCT Filed: Sep. 22, 2003

(86) PCT No.: PCT/CN03/00802

§ 371 (c)(1),
(2), (4) Date: Oct. 17, 2005

(87) PCT Pub. No.: WO2004/026512

PCT Pub. Date: Apr. 1, 2004

(65) Prior Publication Data

US 2006/0091619 A1 May 4, 2006

(30) Foreign Application Priority Data

Sep. 20, 2002  (CN) ................................ 02 1 35490

(51) Int. Cl.
*B23B 31/02* (2006.01)
(52) U.S. Cl. .................. 279/62; 279/125; 279/140; 279/902
(58) Field of Classification Search .............. 279/60, 279/61, 62, 125, 140, 902
See application file for complete search history.

(56) References Cited

U.S. PATENT DOCUMENTS

| | | | | |
|---|---|---|---|---|
| 4,669,932 A * | 6/1987 | Hartley | ............... | 408/239 R |
| 5,183,274 A * | 2/1993 | Sakamaki | ............... | 279/62 |
| 5,499,829 A * | 3/1996 | Rohm | ............... | 279/62 |
| 5,833,247 A * | 11/1998 | Deuschle et al. | ............... | 279/62 |
| 6,007,071 A * | 12/1999 | Middleton | ............... | 279/62 |
| 6,196,554 B1 * | 3/2001 | Gaddis et al. | ............... | 279/63 |
| 6,302,407 B1 * | 10/2001 | Hsueh | ............... | 279/62 |
| 6,488,286 B2 | 12/2002 | Yaksich | | |
| 6,729,812 B2 | 5/2004 | Yaksich et al. | | |
| 6,824,141 B1 * | 11/2004 | Sakamaki et al. | ............... | 279/62 |
| 6,848,691 B2 * | 2/2005 | Yang et al. | ............... | 279/62 |
| 7,125,021 B2 * | 10/2006 | Tan | ............... | 279/62 |
| 7,128,324 B2 * | 10/2006 | Yang et al. | ............... | 279/62 |
| 7,296,803 B2 * | 11/2007 | Yang et al. | ............... | 279/62 |

FOREIGN PATENT DOCUMENTS

| | | |
|---|---|---|
| CN | ZL98206288.5 | 9/1999 |
| CN | 1288802 | 3/2001 |

\* cited by examiner

*Primary Examiner*—David Bryant
*Assistant Examiner*—Eric A Gates
(74) *Attorney, Agent, or Firm*—Nixon Peabody LLP

(57) ABSTRACT

A power drill chuck comprising a drill body, a nut, jaws, a front sleeve, a rear sleeve, a nut sleeve, and a rolling body, wherein jaws are mounted in inclined holes in the drill body. The nut thread constitutes a thread drive with the thread of the jaws. The front sleeve is connected with the drill body, wherein the nut sleeve is connected to the nut and extends backwards in a rear end having a plurality of projecting keys. The rear sleeve is mounted with and rotates relative to the nut sleeve and the drill body. The rear sleeve includes annular holes and a plurality of keys on its inner end surface. A positioning sleeve is connected to the drill body to position the rear sleeve on the drill body. A plurality of impact members are provided with a plurality of elastic deformation portions and projecting keys.

9 Claims, 5 Drawing Sheets

POWER DRILL CHUCK

CROSS-REFERENCE TO RELATED APPLICATION

This application claims priority based on International Patent Application No. PCT/CN03/00802, entitled "A Power Drill Chuck" by Xingda TAN, which claims priority of Chinese Application No. 02135490.1, filed on Sep. 20, 2002, and which was not published in English.

TECHNICAL FIELD

The present invention relates to a clamping device for drilling tools, and particularly to a power drill chuck.

BACKGROUND ART

As we know, a manually tightened drill chuck in the present art generally includes a drill body, jaws, a nut, a nut sleeve, a bearing, a front sleeve, and a rear sleeve. The three jaws are mounted respectively in three inclined holes that are trisection of said drill body. The nut is mounted in a nut slot of the drill body. The nut thread constitutes a thread drive mechanism together with the thread of the jaws. The nut sleeve is fixedly connected with the nut. Between the front sleeve and the nut or the nut sleeve a key type connection is adopted. The rear sleeve is fixedly connected with the drill body that is provided with a threaded hole or a tapered hole on its rear portion. During using after being mounted, the drill body is connected with a drive shaft screw of power machine by the threaded hole at its rear portion. The drive shaft drives the drill body and thereby brings the three jaws and the tool being clamped to rotate synchronously. While mounting and clamping the tool, the front sleeve and the rear sleeve are grasped by hands and are rotated from each other so that the nut connected with the front sleeve rotates relative to the jaws in the drill body. Through the thread drive between the nut and the jaws, the jaws are moved forwards along the inclined holes of the drill body to clamp the tool handle. While expecting to clamp the tool handle more firmly, one should exert strength to rotate the front and rear sleeve much by hands. As the twisting force from hands is limited, the clamping force acted on the tool handle generated from the drill chuck by manually rotating is at a lower level. Thus the clamped tool tends to get loosen when the working resistance is larger. The patent U.S. 005988653A disclosed a clamping device that clamps the tool handle in virtue of the power of the electric tool. However, the structure of the device is much complex.

SUMMARY OF THE INVENTION

Accordingly, the technical object of the present invention is to provide a power drill chuck that has simple structures and is convenient to use, and through which a power tightened clamp can be obtained and the clamp is secure.

To achieve the above-mentioned object, the present invention provides a power drill chuck including a drill body, a nut, jaws, a front sleeve, a rear sleeve, a nut sleeve, and a rolling body, wherein the three jaws are mounted respectively in three inclined holes which are trisection of the drill body, the nut thread constitutes a thread drive mechanism together with the thread of the jaws mounted in the three inclined holes of the drill body, the front sleeve is fixedly connected with the drill body, which is characterized in that the nut sleeve is fixedly connected with the nut and extends backwards, in the rear end of which a plurality of projecting key are provided, the rear sleeve is mounted around the rear portion of the nut sleeve and can be rotated with respect to the nut sleeve and the drill body, there are some piecewise annular holes provided on the rear end surface of the rear sleeve and a plurality of keys on the inner end surface, a positioning sleeve is fixedly connected with the rear portion of the drill body to limit axially the position of the rear sleeve on the drill body, a plurality of elastic impact members are mounted between the nut sleeve and the rear sleeve, the elastic impact members are provided with a plurality of elastic deformation portions which are capable of elastic deformation and a plurality of projecting keys.

In the power drill chuck according to the present invention, there is a location ring provided in the rear sleeve and the rear portion of the drill body, the location ring is provided with a plurality of connecting keys and connecting holes. There is an anti-friction ring or bearing provided between an exterior wall of the nut sleeve and an inner wall of the rear sleeve.

With the above-mentioned structures according to the present invention, the drill body of the drill chuck is connected with the drive shaft of the electric drill and can rotate synchronously with it. While using, the drive shaft drives the drill body and the jaws to rotate; the rear sleeve is gripped with hands to keep immovable. A location ring can also be mounted between the rear sleeve and the front end of the electric drill to locate and fixed at the front end of the electric drill. The location ring is provided with keys that restrict the rear sleeve to rotate relative to the location ring only in a certain angle and not to rotate at both extreme position of the angle. In the drill chuck, the nut and the nut sleeve are fixedly connected, the slopes of the projecting keys at the rear end of the nut sleeve and the slopes of the projecting keys of the elastic impact member get in contact with each other, and the elastic impact member is connected to the rear sleeve, thereby the nut are prevented from rotating so that a relative rotation occurs between the jaws and the nut. Through the thread drive of the nut and the jaws, the jaws are closed until the jaws contact the tool handle to be clamped. After the jaws have contacted and clamped the tool handle, the resistance to the thread drive of the nut and the jaws increases rapidly, and the slopes of the projecting keys at the rear end of the nut sleeve and the slopes of the projecting keys of the elastic impact member are pressed against each other, so that the elastic impact member is forced to overcome the resilience of the elastic deformation portion and moves along the slopes of the projecting keys until the tops of the both projecting keys are in contact, and subsequently, the tops of the both projecting keys slide relatively and run out of in contact, in this manner, the nut and the jaws are rotated synchronously. Being driven by the rotating torque of the drive shaft of the electric hand drill, the drill body, the jaws, the nut, and the nut sleeve rotate synchronously together with the drive shaft of the electric hand drill, and at the same time, the elastic impact member returns reversely to its original position again owing to the elasticity of the elastic deformation portion, such that while moving, the slopes of the projecting keys of the nut sleeve come into impact with the slopes of the projecting key of the elastic impact member. Under the effect of impact a slight relative rotation occurs between the nut and the jaws so that the jaws can clamp the tool handle more firmly. The elastic impact member is forced to overcome the resilience of the elastic deformation portion such that the both projecting keys are out of contact again due to the impact force between the slopes of the both projecting keys. The drive shaft of the electric hand drill rotates continuously, the impact course is repeated continuously, and thereby the tool handle is clamped firmly by the jaws. When expecting to loosen the tool, the drive shaft of the electric hand drill are driven to rotate reversely, the slopes of the projecting keys of the nut sleeve and the slopes of the projecting keys of the elastic impact member impact and disengage from each other repeatedly in reverse direction until the threads of the nut and the jaws move relatively to loosen the tool handle being clamped. An anti friction ring or a bearing may be mounted between the stationary rear sleeve and the rotational nut sleeve to keep the nut sleeve to rotate agilely along with the drill body. Comparing with the prior art, the drill chuck according to the present invention has a powered clamping function, such that the gripping power for handle of the tool is improved to ensure the clamp secure. The present invention is suitable for all kinds of clamping of drilling tool.

BRIEF DESCRIPTION OF THE DRAWINGS

Now the present invention will be described more detail in conjunction with the accompanying drawing, in which.

The same reference numbers are used to indicate the same or similar parts in the accompanying drawings according to the present invention.

DESCRIPTION OF PREFERRED EMBODIMENTS

Figure 1:
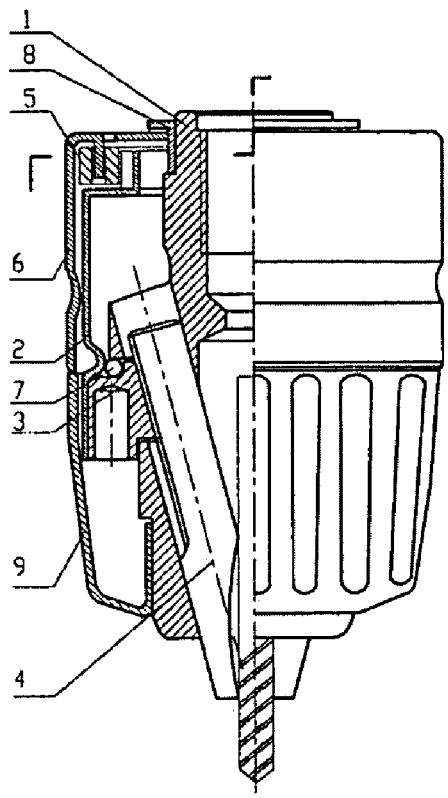
FIG. 1 is a structure schematic view of a power drill chuck, i.e., an elevation sectional view according to the first embodiment of the present invention.
Figure 2:
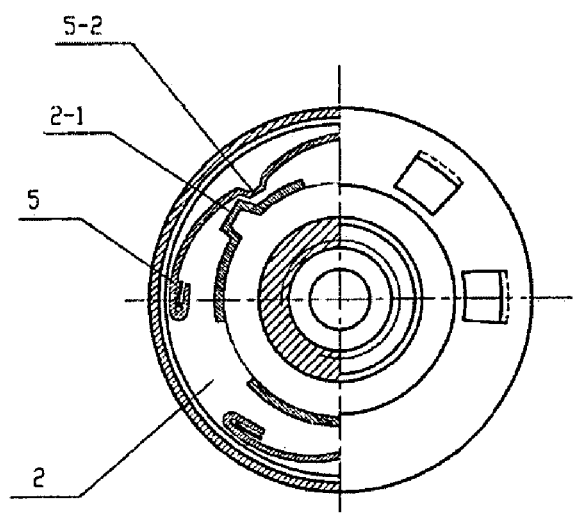
FIG. 2 is a top sectional view according to the first embodiment of the present invention.
Figure 3:
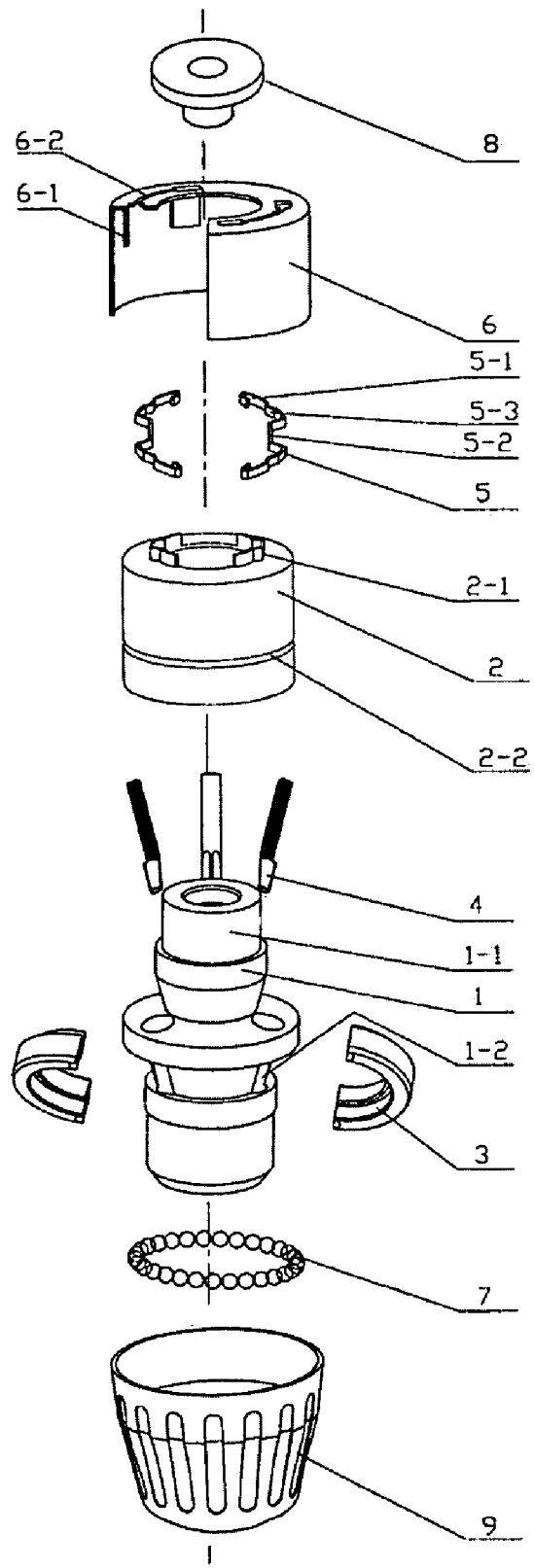
FIG. 3 is a structure exploded view according to the first embodiment of the present invention.

The first embodiment: As shown in FIGS. 1, 2, and 3, a power drill chuck is illustrated which includes a drill body 1, a nut sleeve 2, a nut 3, jaws 4, an elastic impact member 5, a rear sleeve 6, a rolling body 7, a positioning sleeve 8, and a front sleeve 9. The three jaws 4 are mounted respectively in three inclined holes which are trisection of the drill body. The thread of the nut 3 constitutes a thread drive together with the thread of the jaws 4 mounted in the three inclined holes of the drill body. The front sleeve 9 is fixedly connected to the drill body 1. The nut sleeve 2 is fixedly connected to the nut 3 and extends backwards, in its rear end a plurality of projecting keys 2-1 are provided. The rear sleeve 6 is mounted around the rear portion of the nut sleeve 2 and can rotate relative to the nut sleeve and the drill body. There are some piecewise annular holes 6-2 provided on the rear end surface of the rear sleeve 6 and a plurality of keys 6-1 on the inner end surface. The positioning sleeve 8 is fixedly connected to the rear portion of the drill body 1 so as to position the rear sleeve axially on the drill body. A plurality of elastic impact members 5 is mounted between the nut sleeve and the rear sleeve. The elastic impact members are provided with a plurality of deformation portions 5-3 and a plurality of projecting keys 5-2.

While using, the power drill chuck is connected to the screw of the drive shaft of an electric portable drill through a thread hole in the rear portion of the drill chuck. The positioning sleeve 8 is fixedly connected to the rear portion 1-1 of the drill body 1 so as to position the rear sleeve axially on the drill body 1. The rear sleeve can rotate with respect to the drill body 1 and the positioning sleeve 8. On the inner end face of the rear sleeve 6 there are provided with a plurality of keys 6-1 to which the elastic impact members 5 are mounted by fitting parts 5-1 thereof. The elastic impact members 5 are provided with a plurality of deformation portions 5-3 and a plurality of projecting keys 5-2. Both sides of the projecting key 5-2 in the directions along the circumference are slopes. The nut sleeve 2 is fixedly connected to the nut 3 and extends backwards, in rear end of which a plurality of projecting keys 2-1 are provided. Both sides of the projecting key 2-1 in the directions along the circumference are slopes. The nut sleeve 2 is also provided with an annular rib 2-2 projecting inwards for restricting the rolling bodies 7 assembled in the nut. When the power of the electric drill is switched on, the drive shaft of the electric drill drives in turn the drill body 1, the front sleeve 9, the positioning sleeve 8, and the jaws 4 to rotate.

While the rear sleeve 6 is out of the restriction of the resistance, the slopes of the projecting keys 5-2 of the elastic impact member 5 contacts the slopes of the projecting keys 2-1 of the nut sleeve 2 such that the rear sleeve rotates along with the nut sleeve 2. When a tool is required to be clamped, one may grasps the rear sleeve 6 slightly and keeps the same to be immovable such that the elastic impact member 5, the nut sleeve 2 and the nut 3 are immovable while the dill body 1 and the jaws 4 rotate along with the drive shaft of the electric drill. In this case, a relative rotation occurs between the jaws 4 and the nut 3, thereby, the jaws 4 move forwards along the inclined holes 1-2 in the drill body 1 so as to clamp the tool handle 104 in virtue of the thread drive. As the drill body 1 and jaws 4 continue to rotate along with the drive shaft of the electric drill, the pressure applied to the slopes of the projecting keys 5-2 of the elastic impact member by the slopes of the projecting keys 2-1 of the nut sleeve increases rapidly, so that the elastic impact member 5 is forced to be deformed elastically and retracts relative to the projecting keys 2-1 of the nut sleeve. The projecting keys 2-1 of the nut sleeve and the projecting keys 5-2 of the elastic impact member slide relatively and run out of contact, and then the elastic impact member 5 returns to its original position again by its inherent elasticity. The nut sleeve 2 and the nut 3 rotate along with the jaws 4 and the drill body 1 so that the projecting keys 2-1 of the nut sleeve impact the projecting keys 5-2 of the elastic impact member. Under the effect of impacting force the nut sleeve 2 brings the nut 3 to get a slight relative rotation relative to the jaws 4 so that the clamping force to the tool handle 104 by the jaws 4 increases, and the impacting force obliges the projecting keys of the elastic impact member to retract again. Such impact is repeated and continues until the tool handle 104 is clamped firmly by the jaws 4. Then the grasp to the rear sleeve 6 can be released and the rear sleeve will rotate along with the drill body such that the machining works can be done.

When expecting to loosen the clamped tool 104, the drive shaft of the electric hand drill are required to be rotated reversely, and drive the drill body 1, the front sleeve 9, jaws 4, the nut 3, and the nut sleeve 2 to rotate reversely together. The rear sleeve 6 is grasped slightly by hand so that reverse impact repeatedly occurs between the projecting keys 2-1 of the nut sleeve and the projecting keys 5-2 of the elastic impact member. Under such repeated impact, the nut sleeve 2 brings the nut 3 to get a relative rotation relative to the jaws 4 to loosen the tool 104.

Figure 4:
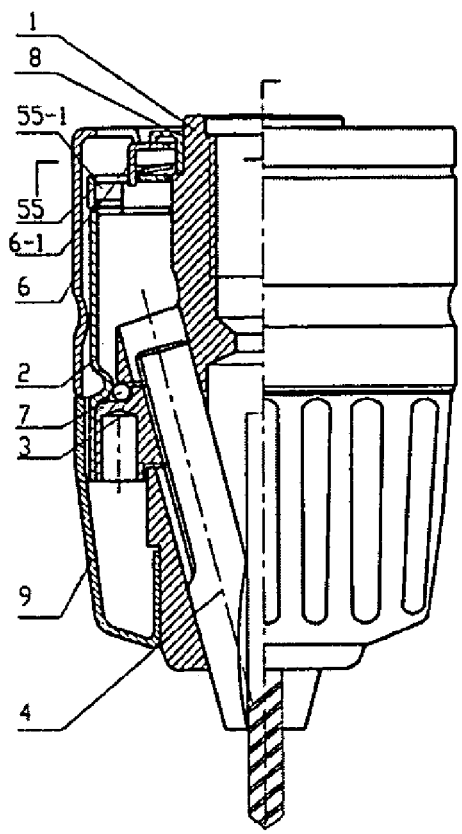
FIG. 4 is an elevation sectional view according to the second embodiment of the present invention.
Figure 5:
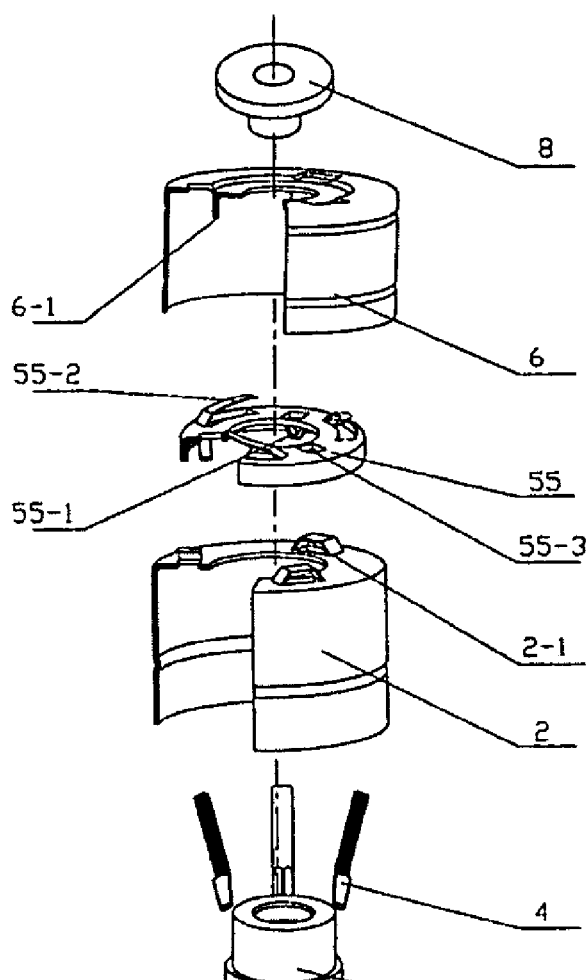
FIG. 5 is a top sectional view according to the second embodiment of the present invention.
Figure 5:
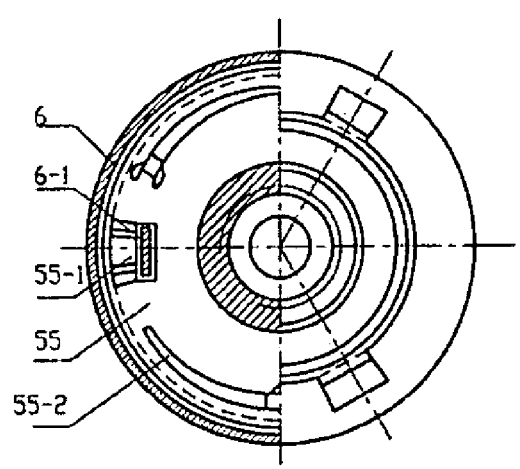
Figure 6:
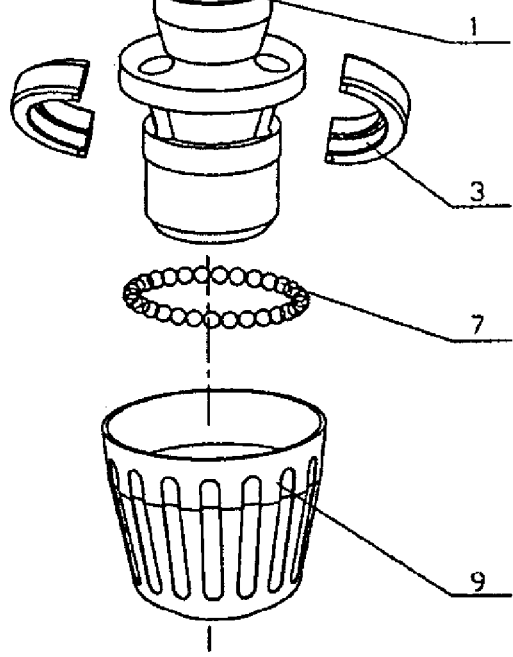
FIG. 6 is a structure exploded view according to the second embodiment of the present invention.

The second embodiment: As shown in FIGS. 4, 5, and 6, a power drill chuck is illustrated which includes a drill body 1, a nut sleeve 2, a nut 3, jaws 4, an elastic impact member 55, a rear sleeve 6, a rolling body 7, a positioning sleeve 8, and a front sleeve 9. Wherein the elastic impact member 55 is dish-shaped and provided with a plurality of deformation portions 55-2 and a plurality of down-projected projecting keys 55-1. The nut sleeve 2 is provided with upper-projected projecting keys 2-1. Both sides of the down-projected projecting keys 55-1 of the elastic impact member and the upper-projected projecting keys 2-1 of the nut sleeve 2 in the directions along the circumferences thereof are slopes. The elastic impact member 55 is mounted on the projecting keys 6-1 of the rear sleeve through slots 55-3 such that the elastic impact member 55 may slide up and down along the projecting keys 6-1 of the rear sleeve under the effect of the elastic deformation portion 55-2. The slopes of the projecting keys 55-1 of the elastic impact member 55 contact the slopes of projecting keys 2-1 of the nut sleeve 2.

When a tool requires to be clamped, one may grasps the rear sleeve 6 slightly and keeps the same to be immovable such that the nut sleeve 2 and the nut 3 are immovable together with the elastic impact member 55 and the rear sleeve 6 under the resistance of the projecting keys 2-1. At this time, a relative rotation occurs between the jaws 4 and the nut 3, thereby, the jaws 4 move forwards along the inclined holes 1-2 in the drill body 1 so as to clamp the tool handle 104 in virtue of the thread drive. As the drill body 1 and jaws 4 continue to rotate along with the drive shaft of the electric drill, the resistance for relatively rotating between the jaws 4 and the nut 3 and the press imposed on the slopes of the projecting keys 55-1 of the elastic impact member by the slopes of the projecting keys 2-1 of the nut sleeve increases rapidly, so that the elastic impact member 55 is forced to be deformed elastically at the elastic deformation portions 55-2 thereof and retracts backwards. The projecting keys 2-1 of the nut sleeve and the projecting keys 55-1 of the elastic impact member slide relatively and run out of contact, and then the elastic impact member 55 returns to its original position again by the elasticity of the elastic deformation portion 55-2. The nut sleeve 2 and the nut 3 continue to rotate along with the jaws 4 and the drill body 1 so that the projecting keys 2-1 of the nut sleeve impact the projecting keys 55-1 of the elastic impact member. Under the effect of impact the nut sleeve 2 brings the nut 3 and makes the same having a slight relative rotation relative to the jaws 4 and the clamping force to the tool handle 104 by the jaws 4 increases. The impacting force depresses the projecting keys of the elastic impact member to retract again. Such impact is repeated and continues until the tool handle 104 is clamped firmly by the jaws 4. Then the grasp to the rear sleeve 6 can be relapsed and the rear sleeve will rotate along with the drill body such that the machining works can be done.

When expecting to loosen the clamped tool 104, the drive shaft of the electric hand drill is required to be rotated reversely, and drive the drill body 1, the front sleeve 9, jaws 4, the nut 3, and the nut sleeve 2 to rotate reversely together. The rear sleeve 6 is grasped slightly by hand so that reverse impact repeatedly occurs between the projecting keys 2-1 of the nut sleeve and the projecting keys 5-1 of the elastic impact member. Under such repeated impact, the nut sleeve 2 brings the nut 3 and makes the same having a relative movement relative to the jaws 4 to loosen the tool 104.

Figure 7:
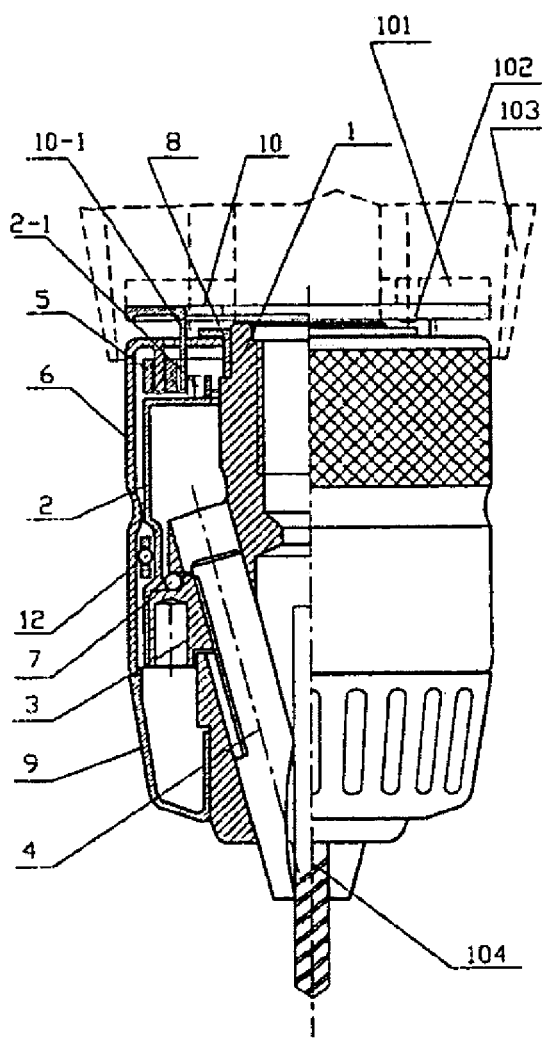
FIG. 7 is an elevation sectional view according to the third embodiment of the present invention.
Figure 8:
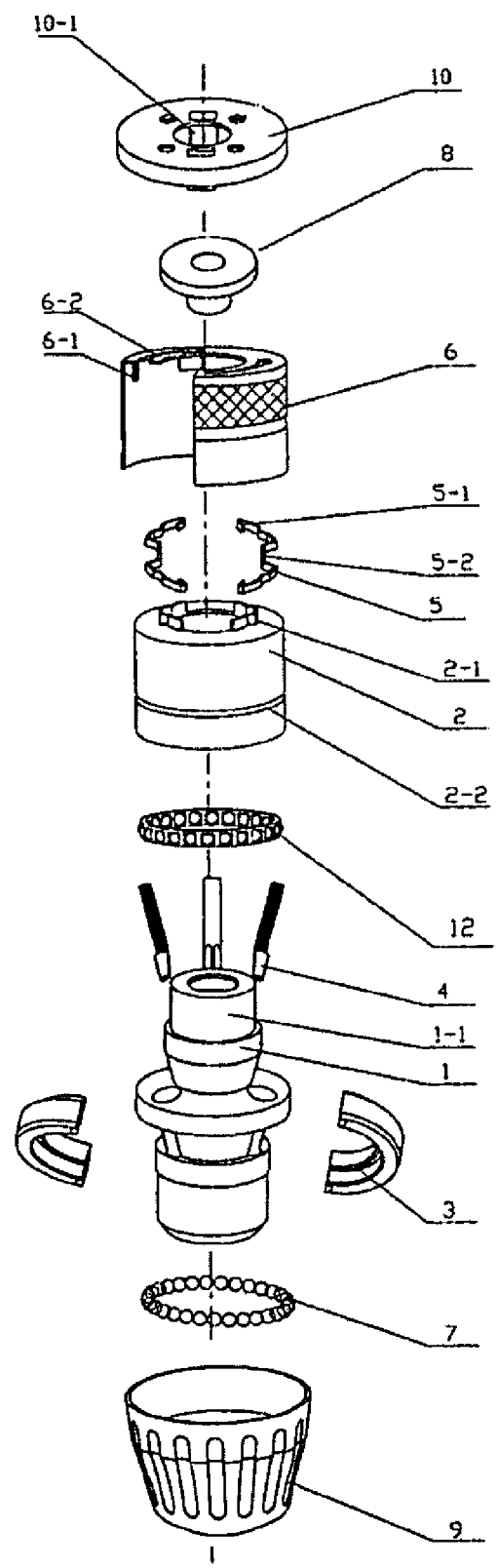
FIG. 8 is a structure exploded view according to the third embodiment of the present invention.

The third embodiment: The power drill chuck of the present invention may further include a location ring 10 at the rear sides of the rear sleeve 6 and the drill body 1. The location ring is provided with a plurality of connection keys and connection holes. As shown in FIGS. 7 and 8, there illustrated is the power drill chuck which includes a drill body 1, a nut sleeve 2, a nut 3, jaws 4, an elastic impact member 5, a rear sleeve 6, rolling bodies 7, a positioning sleeve 8, a front sleeve 9, a location ring 10, and a bearing 12. While mounting the drill chuck to a electric hand drill, firstly the location ring 10 is fixed to a annular member 101 provided in the shield cup 103 of the electric hand drill through screws 102 with the connection keys 10-1 of the location ring 10 being inserted in the annular holes 6-2 of the rear sleeve 6. Then the thread hole in the rear portion of the drill chuck is engaged with the screw of the drive shaft of the electric hand drill. The rear sleeve is rotated in normal direction such that the reversed side walls of the annular holes 6-2 of the rear sleeve contact the keys 10-1 of the location ring. The elastic impact member 5 is mounted on the projecting keys 6-1 of the rear sleeve through a fitting portion 5-1 such that the slopes of the projecting keys 5-2 of the elastic impact member 5 contact the slopes of the projecting keys 2-1 of the nut sleeve. Since the rear sleeve 6 is resisted by the connection keys 10-1 of the location ring and cannot move in normal direction, the nut sleeve 2 and the nut 3 cannot rotate in normal direction too as the contact of the projecting keys 5-2 of the elastic impact member and the projecting keys 2-1 of the nut sleeve.

The switch of the electric hand drill is closed so that the drive shaft of the electric hand drill brings the drill body 1, the jaws 4 and the front sleeve 9 to rotate together. The threads of the jaws 4 and the threads of the nut 3 form a thread drive, thereby, the jaws 4 move forwards along the inclined holes in the drill body 1 until the tool handle 104 is clamped. As the drill body 1 and jaws 4 continue to rotate along with the drive shaft of the electric hand drill, the press imposed on the slopes of the projecting keys 5-2 of the elastic impact member by the slopes of the projecting keys 2-1 of the nut sleeve increases rapidly so that the elastic impact member 5 is forced to be deformed elastically and retracts backwards relative to the projecting keys 2-1 of the nut sleeve to rotate the nut sleeve 2 and the nut 3 together with the jaws 4 and the drill body 1. After the projecting keys 2-1 of the nut sleeve travels over the projecting keys 5-2 of the elastic impact member, the projecting keys 5-2 of the elastic impact member 5 returns to its original position again by the elastic resilience. The nut sleeve 2 continues to rotate so that the projecting keys 2-1 impact the projecting keys 5-2 of the elastic impact member. The impact force generates a slight relative movement between the nut 3 and the jaws 4 and increases the clamping force to the tool handle 104 by the jaws 4. The impact force oppresses the projecting keys of the elastic impact member to retract again, such impact is repeated and continues until the tool handle 104 is clamped firmly by the jaws 4.

What is described in the above is the course that the tool is clamped. When expecting to start a machining work, one should rotate the rear sleeve 6 reversely such that the connection keys 10-1 presses the elastic impact member 5 to deform, and presses against the projecting keys 5-2 to ensure the projecting keys 5-2 not contacting with the projecting keys 2-1 of the nut sleeve. In this state, the nut sleeve 2 and the nut 3 can rotate along with the drill body 1 and the jaws 4 without hindrance. Between the nut sleeve 2 and the rear sleeve 6 a bearing 12 is mounted to ensure that the nut sleeve 2 can rotate agilely at high speed.

Figure 9:
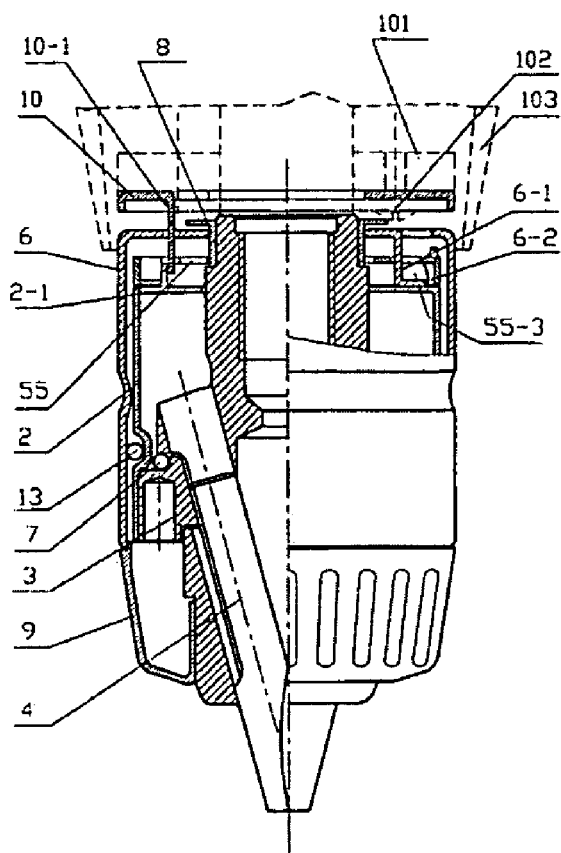
FIG. 9 is an elevation sectional view according to the fourth embodiment of the present invention.
Figure 10:
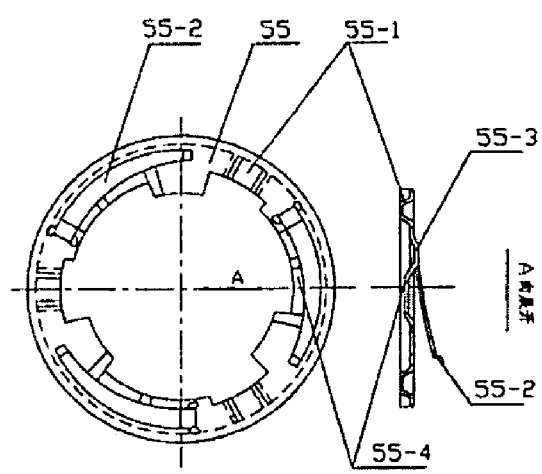
FIG. 10 is a structure schematic view of the elastic impact member according to the fourth embodiment of the present invention.
Figure 11:
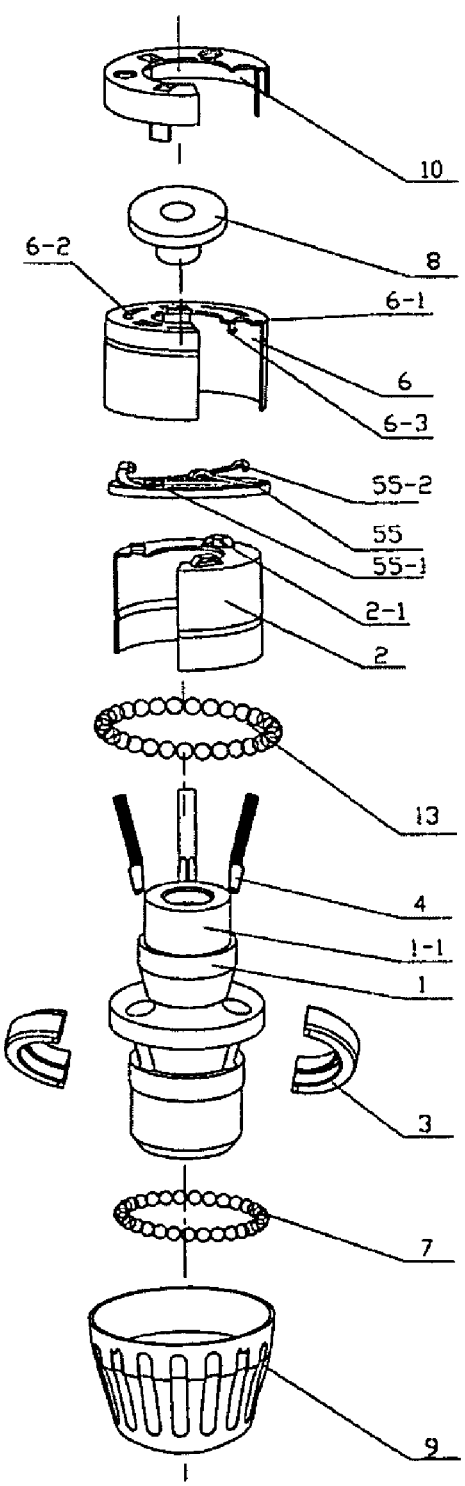
FIG. 11 is a structure exploded view according to the fourth embodiment of the present invention.

When expecting to loosen the clamped tool, one should further rotate reversely the rear sleeve 6 such that the normal-direction side walls of the annular holes 6-2 of the rear sleeve contact the connection keys 10-1 of the location ring. In this state, the pressure applied to the projecting keys 5-2 of the elastic impact member by the connection keys 10-1 is released and the elastic impact member 5 returns to its original position. The drive shaft of the electric hand drill is rotated reversely to drive the drill body 1, the front sleeve 9, jaws 4, the nut 3, and the nut sleeve 2 to rotate reversely together. An impact repeatedly occurs between the projecting keys 2-1 of the nut sleeve and the projecting keys 5-2 of the elastic impact member. Under such repeated impact, the nut sleeve 2 brings the nut 3 and makes the same having a relative rotation relative to the jaws 4 to ease the tool handle 104 off The fourth embodiment: As shown in FIGS. 9 and 11, the illustrated is another power drill chuck in which the constituting structure is substantially the same as that of the third embodiment, and no descriptions will be made any more for the same parts. The projecting keys 55-1 and the elastic deformation portions 55-2 of the elastic impact member 55 take an end face-ananged structure. The projecting keys 55-1 are down-projected, as shown in FIG. 10. At the same time the elastic impact member 55 is provided with cam curved surfaces 55-3 and 55-4 that is changed in the direction of the axis. Under the resilience of the elastic deformation portions 55-2, the cam-curved surfaces 55-3 or 55-4 keeps in contact with the pawls 6-3 of the rear sleeve keys 6-1 all along. The projecting keys 2-1 of the nut sleeves 2 are also an end face-arranged structure and are upper-projected. Rolling bodies 13 are mounted between the nut sleeve 2 and the rear sleeve 6.

While the rear sleeve 6 is rotated in normal direction, the pawl 6-3 of the rear sleeve keys 6-1 is located at position of the cam-curved surfaces 55-3. The resilience of the elastic deformation portion 55-2 moves the elastic impact member 55 forwardly to contact the nut sleeve 2. After the tool handle 104 has been clamped, when the nut sleeve 2, together with the nut 3, the drill body 1 and the jaws 4, rotate along with the drive shaft of the electric hand drill, impact occurs between the slopes of the projecting keys 2-1 of the nut sleeve and the slopes of the projecting keys 55-1 of the elastic impact member so that the nut 3 fixedly connected with the nut sleeve 2 generates a slight relative rotation relative to the jaws 4, thus the jaws can clamp the tool more tightly.

When expecting to remove the tool handle 104, the drive shaft of the electric hand drill is required to be rotated reversely. The projecting keys 2-1 of the nut sleeve impact the projecting keys 55-1 of the elastic impact member, and thereby, the nut 3 generates a reverse relative rotation relative to the jaws 4 to loosen the tool handle 104. When the tool has been clamped and the machining work will start, one should rotates the rear sleeve 6 reversely to position the pawls 6-3 of the rear sleeve keys at the position of the cam curved surfaces 55-4 of the elastic impact member, and thereby the projecting keys 55-1 of the elastic impact member may be out of contact with the projecting keys 2-1 of the nut sleeve 2 completely, such that the nut sleeve 2 and the nut 3 rotate along with the drill body 1 and the jaws 4 without hindrance. The principle of operation of this embodiment is the same as that of the third embodiment.

Figure 12:
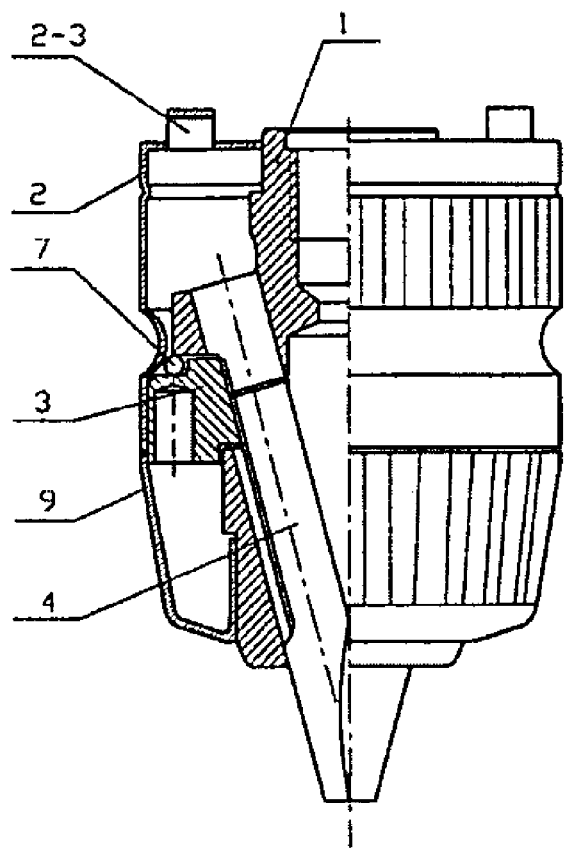
FIG. 12 is an elevation sectional view according to the fifth embodiment of the present invention.
Figure 13:
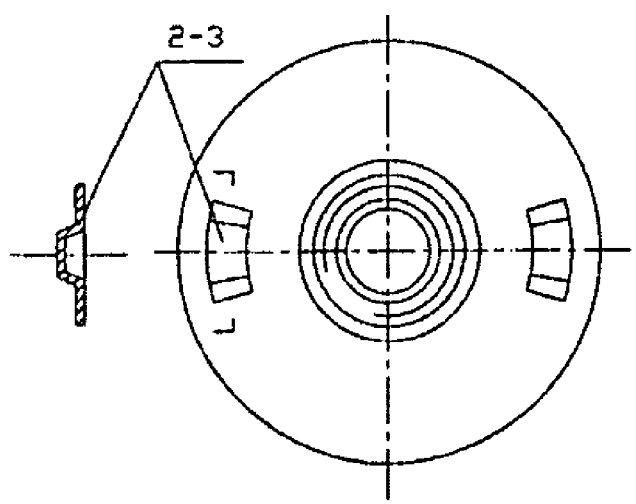
FIG. 13 is a top view of FIG. 12 of the present invention.

The fifth embodiment: As shown in FIGS. 12 and 13, the illustrated is a power drill chuck which includes a drill body 1, a nut sleeve 2, a nut 3, jaws 4, rolling bodies 7, and a front sleeve 9. The projecting keys 2-3 provided at the rear end face of the nut sleeve 2 can impact the impact projecting keys specially-designed in the electric hand drill so as to clamp the tool.

What is claimed is:

1. A power drill chuck comprising a drill body, a nut, jaws, a front sleeve, a rear sleeve, a nut sleeve, a rolling body, wherein three jaws are mounted respectively in three inclined holes which are trisection of the drill body, a nut thread constitutes a thread drive together with a thread of the jaws mounted in the three inclined holes of the drill body, the front sleeve is fixedly connected with the drill body, what is characterized in that the nut sleeve is fixedly connected to the nut and extends backwards, in a rear end of which a plurality of projecting keys are provided, the rear sleeve is mounted around the rear portion of the nut sleeve and may rotate relative to the nut sleeve and the drill body, the rear sleeve is provided with piecewise annular holes on its rear end surface and a plurality of keys on its inner end surface, a positioning sleeve is fixedly connected to the rear portion of the drill body to position axially the rear sleeve on the drill body, a plurality of elastic impact members are mounted between the nut sleeve and the rear sleeve, the elastic impact members are provided with a plurality of elastic deformation portions and a plurality of projecting keys.

2. The power drill chuck as described in claim 1, wherein there is a location ring provided at the rear portion of the rear sleeve and the drill body, the location ring is provided with a plurality of connecting keys and connecting holes.

3. The power drill chuck as described in claim 2, wherein there is an anti- friction ring or bearing provided between an exterior wall of the nut sleeve and an inner wall of the rear sleeve.

4. The power drill chuck as described in claim 1, wherein both side surfaces of the projecting keys at the rear end of the nut sleeve in the direction of circumference are slopes.

5. The power drill chuck as described in claim 1, wherein at least one elastic impact member is mounted on the keys of the rear sleeve.

6. The power drill chuck as described in claim 1, wherein both side surfaces of the projecting keys of the elastic impact member in the direction of circumference are slopes.

7. The power drill chuck as described in claim 1, wherein at least one elastic impact member is provided with cam curved surfaces changed in a direction of the axis of the drill chuck.

8. The power drill chuck as described in claim 1, wherein the elastic deformation portions of the elastic impact member are separate elastic deforming elements apart from the elastic impact member.

9. The power drill chuck as described in claim 1, wherein the keys at the inner end face of the rear sleeve is provided with pawls.

* * * * *